(12) United States Patent
Lee (10) Patent No.: US 7,736,800 B2
(45) Date of Patent: Jun. 15, 2010

(54) CAN TYPE LITHIUM SECONDARY BATTERY

(75) Inventor: Jin Uk Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1086 days.

(21) Appl. No.: 11/410,306

(22) Filed: Apr. 25, 2006

(65) Prior Publication Data

US 2006/0257729 A1 Nov. 16, 2006

(30) Foreign Application Priority Data

Apr. 25, 2005 (KR) .................. 10-2005-0034227

(51) Int. Cl.
*H01M 2/02* (2006.01)
*H01M 2/30* (2006.01)

(52) U.S. Cl. ...................... 429/181; 429/180

(58) Field of Classification Search ............. 429/61, 429/174, 179–181
See application file for complete search history.

(56) References Cited

U.S. PATENT DOCUMENTS

2001/0004505 A1* 6/2001 Kim et al. .................. 429/180

FOREIGN PATENT DOCUMENTS

| JP | 09-153351 | 6/1997 |
| JP | 2002-042779 | 2/2002 |

* cited by examiner

*Primary Examiner*—Gregg Cantelmo
(74) *Attorney, Agent, or Firm*—Lee & Morse, P.C.

(57) ABSTRACT

A can type lithium secondary battery including an electrode assembly including a first electrode plate, a second electrode plate, and a separator, a can for receiving the electrode assembly and an electrolyte, and a cap assembly including a cap plate, an electrode terminal and a gasket, the cap assembly closing an upper opening of the can, wherein the electrode terminal comes into electrical contact with an upper surface of the cap plate when the can type lithium secondary battery is deformed by a longitudinal pressure.

16 Claims, 4 Drawing Sheets

CAN TYPE LITHIUM SECONDARY BATTERY

BACKGROUND OF THE INVENTION

1. Field of the Invention

The present invention relates to a can type lithium secondary battery. More particularly, the present invention relates can type lithium secondary battery configured to short-circuit in a predetermined manner when subjected to an externally-applied force, thereby providing an enhanced margin of safety.

2. Description of the Prior Art

Batteries are employed in a wide variety of equipment including, to name just a few, vehicles, e.g., electric and hybrid vehicles, portable power tools, electronics, etc. Portable compact electronic devices, e.g., cellular phones, laptop computers, camcorders, etc., are being widely developed and produced. Such portable electronic devices typically include an internal battery pack to allow continuing operation even when no external power supply is available. Such a built-in battery pack typically includes at least one unit battery inside and provides the electronic device with a predetermined level of voltage over a reasonable period of time.

Batteries are generally classified as primary or secondary batteries. Primary batteries are commonly known as single-use batteries, while secondary batteries are commonly known as rechargeable batteries. Both primary and secondary batteries may be suitable for use in portable electronic devices. However, secondary batteries are widely adopted because they can be reused and may be, therefore, more economical than single-use batteries. Secondary batteries have been developed using a wide variety of technologies.

Battery technologies currently favored for portable electronic devices include nickel cadmium (Ni—Cd) batteries, nickel metal hydride (Ni-MH) batteries, lithium (Li) batteries, etc. The Li batteries have, in particular, been widely employed in the latest generation of electronics devices. A Li battery may have an operation voltage of 3.6 V, which is about three times the operation voltage of the comparable Ni—Cd or Ni-MH batteries. The Li battery may exhibit a relatively high energy density per unit weight. In a typical Li battery, a lithium-based oxide may be used as a positive electrode activation material, and a carbon-based material may be used as a negative electrode activation material. Li batteries may be classified as liquid electrolyte batteries and polymer electrolyte batteries, depending on the electrolyte used therein. Liquid electrolyte batteries are also known as lithium ion (Li-ion) batteries and polymer electrolyte batteries are also known as Li polymer batteries. The Li battery may be manufactured in various shapes, e.g., cylindrical can types, rectangular or prismatic can types, pouch types, etc.

A typical can type lithium secondary battery may have an electrode assembly, a battery case for housing the electrode assembly and electrolyte injected inside the battery case to give mobility to charge-carrying ions. The electrode assembly may include a positive electrode plate on which a positive activation material is coated, a negative electrode plate on which a negative activation material is coated and a separator interposed between the positive and negative electrode plates. The separator may serve to prevent short circuits between the positive and negative electrode plates, and to allow only ions to pass. The width of the separator of the electrode assembly may be larger than the widths of the electrode plates, in order to prevent the electrode plates from making contact with each other. However, if such a battery suffers an external impact, e.g., by being dropped or hit, it may develop a short circuit.

Figure 1:
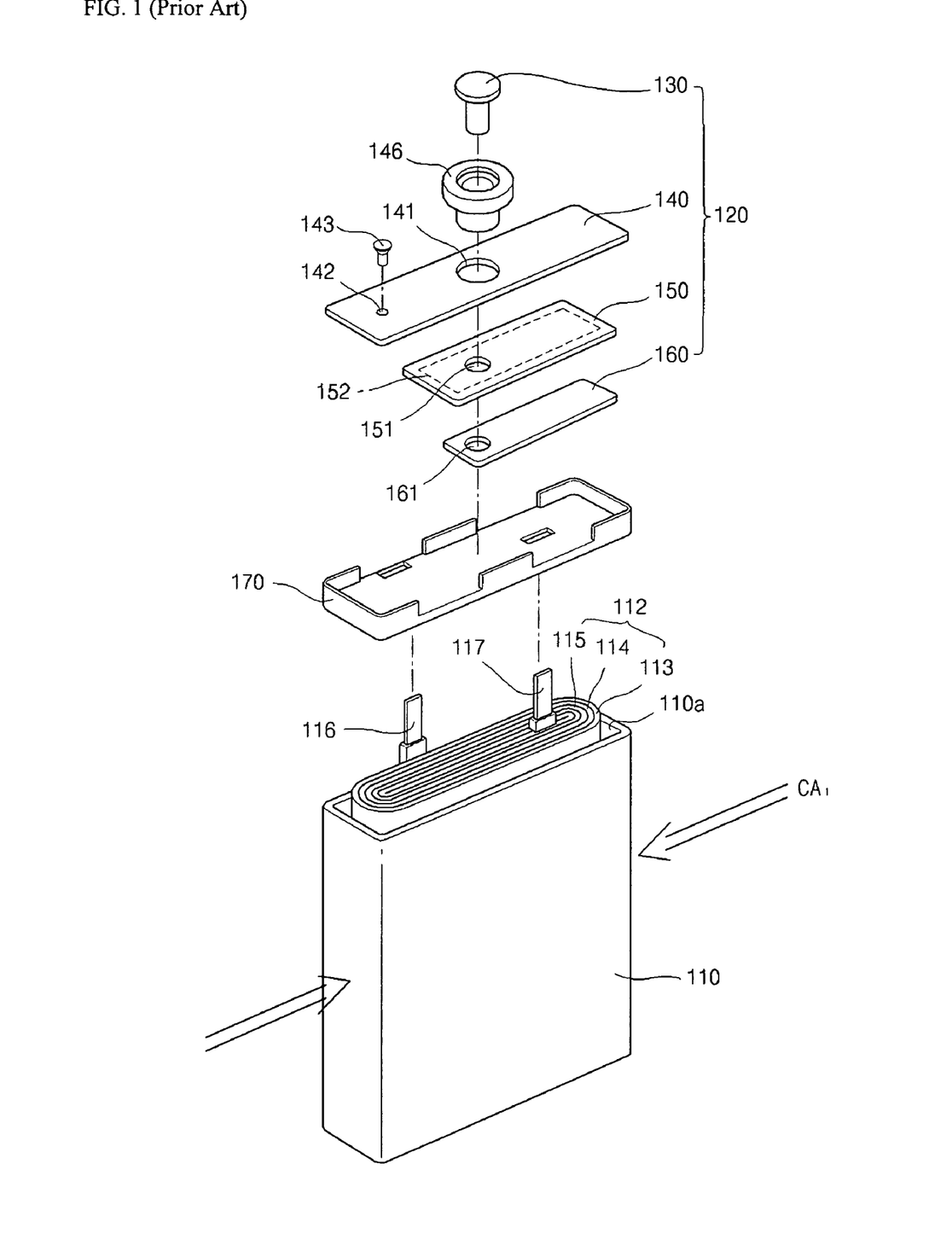
FIG. 1 illustrates an exploded perspective view of a conventional can type lithium secondary battery.

FIG. 1 illustrates an exploded perspective view of a conventional can type lithium secondary battery. Referring to FIG. 1, the can type lithium secondary battery may include an electrode assembly 112 including an anode electrode plate 113, a cathode electrode plate 115 and a separator 114. The can type lithium secondary battery may further include a can 110 for receiving the electrode assembly 112 and an electrolyte, and a cap assembly 120 for tightly sealing an upper opening 110a of the can 110.

The cap assembly 120 may include a cap plate 140, an insulation plate 150, a terminal plate 160 and an electrode terminal 130. The cap assembly 120 may be associated with a separate insulation case 170 and then coupled to the upper opening 110a of the can 110, so as to tightly seal the can 110.

The cap plate 140 may be a metal plate having a size and shape corresponding to those of the upper opening 110a of the can 110. The cap plate 140 may have a through-hole 141, which may be formed at a center portion thereof. The through-hole 141 may have a predetermined size for receiving the electrode terminal 130. A gasket 146, e.g., a gasket having a tubular aspect for encircling the electrode terminal 130, may be mounted on the electrode terminal 130 when the electrode terminal 130 is inserted into the through-hole 141, in order to insulate the electrode terminal 130 from the cap plate 140. The cap plate 140 may have an electrolyte injection hole 142, which may be formed at a side thereof. After the cap assembly 120 is coupled to the upper opening 110a of the can 110, the electrolyte may be injected through the electrolyte injection hole 142 into the can 110. Then, the electrolyte injection hole 142 may be sealed by separate sealing structure 143. The sealing structure 143 may be, e.g., a plug.

The electrode terminal 130 may be connected to a cathode electrode tap 117 of the cathode electrode plate 115, or to an anode electrode tap 116 of the anode electrode plate 113. The electrode terminal 130 may operate as a cathode electrode terminal or an anode electrode terminal.

The insulation plate 150 may be made from the same insulation material as the gasket 146 and may be attached to a lower surface of the cap plate 140. The insulation plate 150 may have a through-hole 151 formed in a portion thereof corresponding to the through-hole 141 of the cap plate 140, for receiving the electrode terminal 130. The insulation plate 150 may have a recess 152 formed in a lower surface thereof, in order to receive the terminal plate 160.

The terminal plate 160 may be made of, e.g., a metal such as nickel or nickel alloy, and may be attached to the lower surface of the insulation plate 150. The terminal plate 160 may have a through-hole 161 formed in a portion thereof corresponding to the through-hole 141 of the cap plate 140, for receiving the electrode terminal 130. The electrode terminal 130 may extend through the through-hole 141 and may be insulated from the cap plate 140 by the gasket 146, and the terminal plate 160 may be electrically insulated from the cap plate 140 while being electrically connected to the electrode terminal 130.

When the electrode terminal 130 is assembled with the cap plate 140, the insulation plate 150 and the terminal plate 160, the electrode terminal 130 may be inserted into the through-hole 141 by being rotated and subjected to a suitable force. After passing though the through-hole 141, the electrode terminal 130 may extend through the through-holes 151 and 161. The through-hole 151 may have a diameter equal to or slightly larger than a diameter of the electrode terminal 130. When the electrode terminal 130 is inserted into the through-hole 151, the peripheral surface of the electrode terminal 130 may come into close contact with and fit in the through-hole 151.

If a short circuit, e.g., an interior short circuit or exterior short circuit of the electrode assembly, occurs in the can type lithium secondary battery described above, an electric current flow may rapidly increase, which may result in the generation of a large temperature increase. Similarly, an overcharge or overdischarge of the can type lithium secondary battery may generate a large temperature increase. As a result, there is a danger of damage to the can type lithium secondary battery, the device the can type lithium secondary battery is installed in and/or the user.

In order to prevent interior short circuits of the can type lithium secondary battery, an insulating tape may be wound on various portions of the can type lithium secondary battery at which the short circuits are likely to occur, including, e.g., terminal portions of the anode and cathode electrode plates and the regions in which the electrode taps are welded in the electrode assembly. Additionally, safety elements, e.g., positive temperature coefficient devices, thermal fuses and protecting circuits, may be built into the can type lithium secondary battery. Such safety elements may interrupt the electric current before it exceeds a safe level, so as to prevent the damage of the can type lithium secondary battery.

However, if the can type lithium secondary battery described above is deformed by an external impact or externally-applied force, the safety elements may not prevent short circuiting between the electrode plates. In particular, when subjected to a standardized compression test or crush test used to evaluate safety for can type secondary batteries, the can type lithium secondary battery may suffer a short circuit between the electrode plates.

In the standardized compression test, a pressure jig is employed to apply a force to the can type lithium secondary battery. The pressure jig is used to compress two sides of the can type lithium secondary battery in a direction normal to the longitudinal axis of the can type lithium secondary battery. In particular, the pressure jig presses the can type lithium secondary battery, such that the pressing surfaces of the pressure jig are kept in parallel with the two sides of the can type lithium secondary battery, and subjects the can type lithium secondary battery to a pressure of about 13 kN in the direction normal to the longitudinal axis of the can type lithium secondary battery. Where the can type lithium secondary battery is a prismatic battery, the test may be repeated along a second axis, using a second sample of the can type lithium secondary battery. That is, referring to FIG. 1, the two short sides of a first sample of the can type lithium secondary battery may be crushed by applying the compressive force of a pressure of about 13 kN applied in the direction of the crush axis $CA_1$.

When a can type lithium secondary battery is compressed according to the standardized compression test method, the anode electrode plate and the cathode electrode plate may be short circuited to each other, thereby allowing the electric current to rapidly flow from the anode electrode plate to the cathode electrode plate. This may result in a large amount of heat being generated by the resistance of the anode and cathode electrode plates. If the amount of heat generated is excessive, the can type lithium secondary battery may explode.

SUMMARY OF THE INVENTION

The present invention is therefore directed to a can type lithium secondary battery, which substantially overcomes one or more of the problems due to the limitations and disadvantages of the related art.

It is therefore a feature of an embodiment of the present invention to provide a can type lithium secondary battery configured to short circuit in a predetermined manner when subjected to a predetermined force.

It is therefore another feature of an embodiment of the present invention to provide a can type lithium secondary battery having one or more safety protuberances extending from an electrode terminal.

It is therefore a further feature of an embodiment of the present invention to provide a can type lithium secondary battery having a gasket configured to isolate an electrode terminal from a cap plate until a predetermined force is applied to the can type lithium secondary battery.

At least one of the above and other features and advantages of the present invention may be realized by providing a can type lithium secondary battery including an electrode assembly including a first electrode plate, a second electrode plate, and a separator, a can for receiving the electrode assembly and an electrolyte, and a cap assembly including a cap plate, an electrode terminal and a gasket, the cap assembly closing an upper opening of the can, wherein the electrode terminal comes into electrical contact with an upper surface of the cap plate when the can type lithium secondary battery is deformed by a longitudinal pressure.

A head of the electrode terminal may be configured to come into electrical contact with the upper surface of the cap plate when the can type lithium secondary battery is deformed by the longitudinal pressure, and wherein the head may have a circular, oval or polygonal cross section in a plane oriented parallel to the cap plate.

The electrode terminal may have at least one safety protuberance extending from a head of the electrode terminal, the head formed at an upper portion of the electrode terminal. The safety protuberance may extend from the head in a length direction of the cap plate. The electrode terminal may have two safety protuberances extending from opposite sides of the head, the two safety protuberances extending from the head in the length direction of the cap plate. The safety protuberance may have a circular, oval or polygonal cross section in a plane oriented perpendicular to the cap plate. The safety protuberance may be configured to come into electrical contact with the upper surface of the cap plate when the can type lithium secondary battery is deformed by the longitudinal pressure. The safety protuberance may have a flat end surface.

The gasket may have a protuberance receiving groove for receiving the safety protuberance of the electrode terminal and may have a head receiving groove for receiving the head of the electrode terminal. The protuberance receiving groove may be shallower than the head receiving groove, such that a portion of the gasket underlying the protuberance is thicker than a portion of the gasket underlying the head. The protuberance receiving groove may end a predetermined distance from a peripheral surface of the gasket so as not to meet the peripheral surface of the gasket. The protuberance receiving groove may be formed so as to extend through a peripheral surface of the gasket.

The cap plate and the electrode terminal may have opposite polarities.

At least one of the above and other features and advantages of the present invention may also be realized by providing a battery including a battery can including a cap plate having a first polarity, and an electrode terminal extending through the cap plate and having a second polarity, the second polarity opposite the first polarity, wherein the battery is configured to create a short circuit between the electrode terminal and the cap plate when a predetermined force is applied to the battery.

The battery may include a gasket electrically isolating the electrode terminal from the cap plate until the predetermined force is applied. The electrode terminal may include a protrusion disposed in a recessed portion of the gasket.

The recessed portion of the gasket may extend through a peripheral edge of the gasket, such that an end of the protrusion is not covered by the gasket at the peripheral edge. The recessed portion of the gasket may not extend through a peripheral edge of the gasket, such that an end of the protrusion is covered by the gasket at the peripheral edge.

At least one of the above and other features and advantages of the present invention may further be realized by providing a battery including a battery housing having an electrode assembly disposed therein, an electrode terminal extending from the electrode assembly through the battery housing, the electrode terminal having a safety means for short circuiting the battery when a predetermined force is applied to the battery, the safety means being disposed outside the battery housing, and an insulating means for maintaining a separation between the electrode terminal and the battery housing, the insulating means being disposed between the electrode terminal and the battery housing, wherein the insulating means maintains the separation between the safety means and the battery housing until the predetermined force is applied, and wherein the insulating means allows the safety means and the battery housing to come into electrical contact once the predetermined force is applied.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Korean Patent Application No. 2005-0034227, filed on Apr. 25, 2005, in the Korean Intellectual Property Office, and entitled "Can Type Lithium Secondary Battery," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

A can type lithium secondary battery according to the present invention may be configured so as to intentionally short circuit in a predetermined manner when subjected to an externally applied force that exceeds a predetermined threshold, such as might occur during safety testing or as a result of an external impact from an accident or misuse of the can type lithium secondary battery. The predetermined threshold may be a pressure somewhat greater than the maximum pressure applied in the standardized compression safety test, i.e., somewhat greater than 13 kN.

The can type lithium secondary battery may include a protuberance designed to intentionally short circuit the can type lithium secondary battery in the predetermined manner in order to avoid or minimize the impact of other, uncontrolled short circuits that may be more dangerous. Thus, it may be possible to reduce heat generation and reduce or prevent the likelihood of an explosion of the can type lithium secondary battery, thereby enhancing the safety of the can type lithium secondary battery. The protuberance of the can type lithium secondary battery may be formed at a side of an electrode terminal and may cause a short circuit between the electrode terminal and a cap plate of a can of the can type lithium secondary battery.

Figure 2:
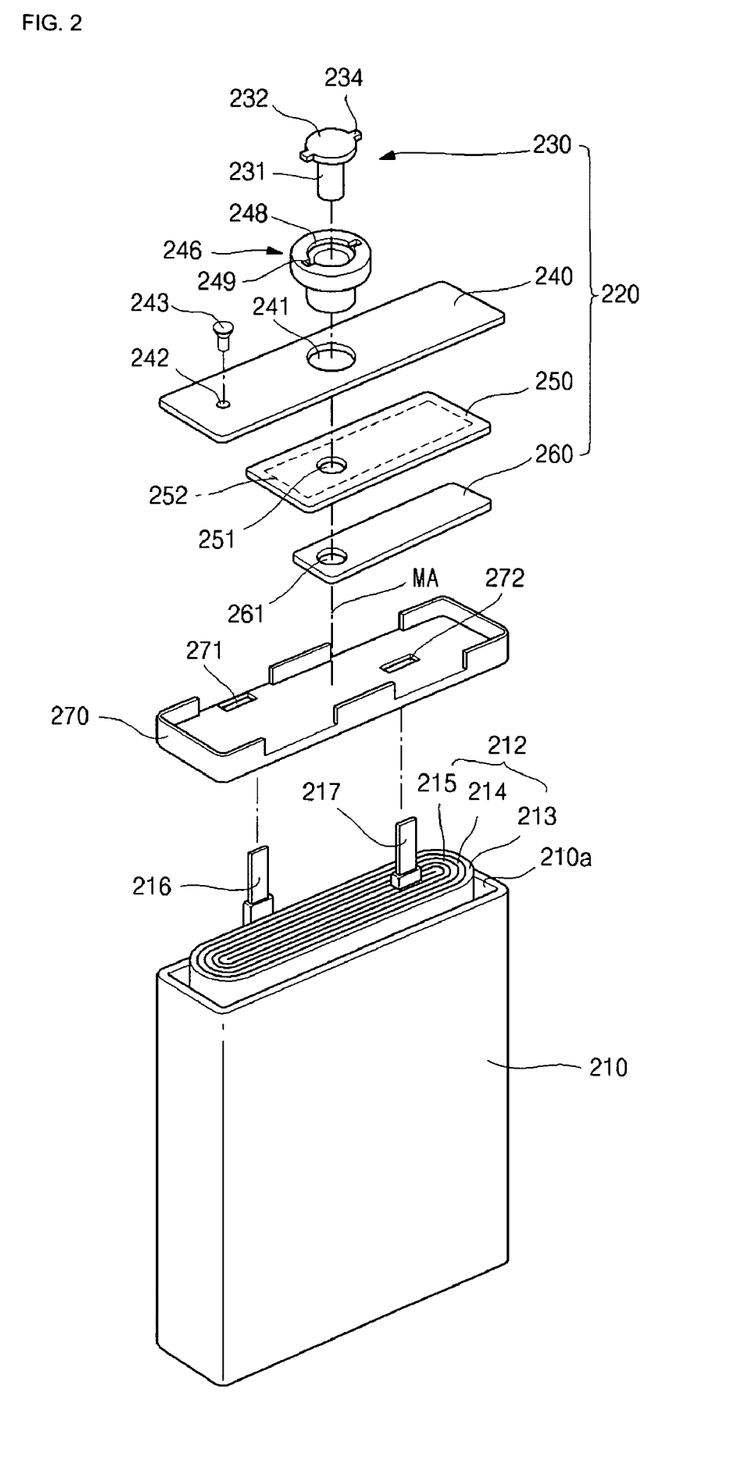
FIG. 2 illustrates an exploded perspective view of a can type lithium secondary battery according to a first embodiment of the present invention.
Figure 3A:
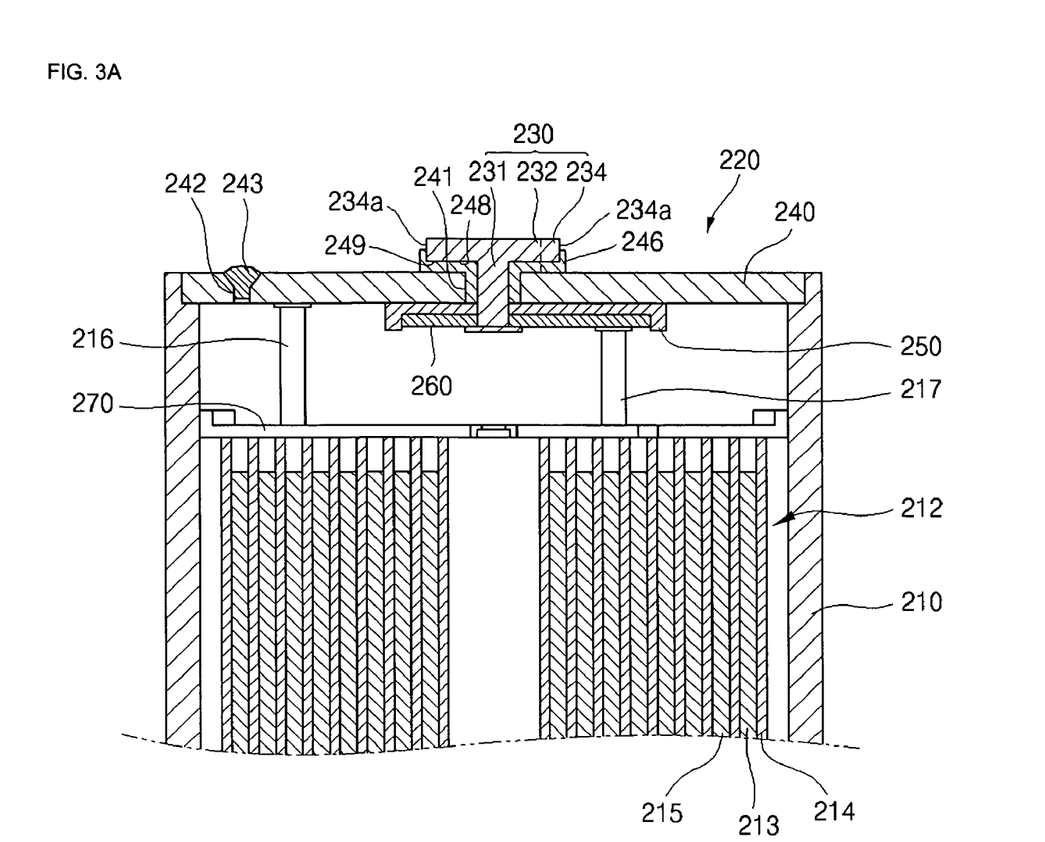
FIGS. 3A-3B illustrate sectional and plan views, respectively, of the battery of FIG. 2.
Figure 3B:
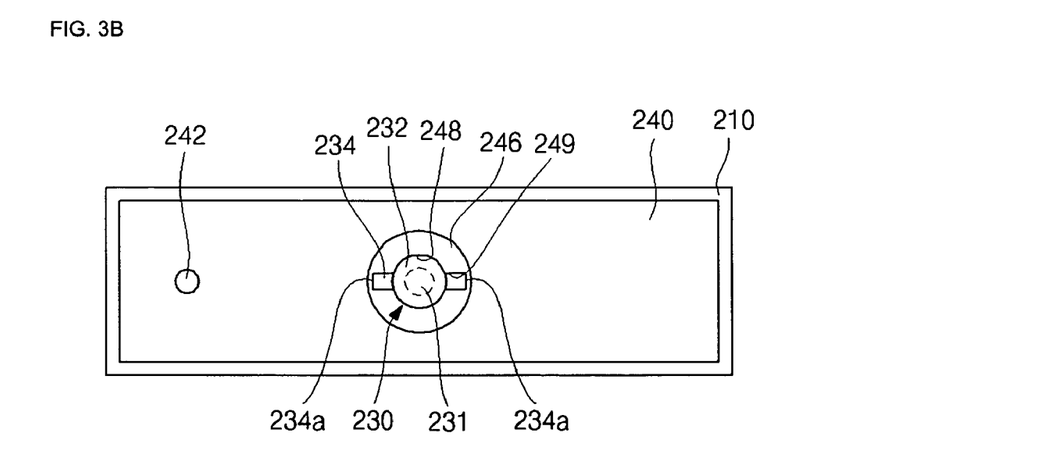

FIG. 2 illustrates an exploded perspective view of a can type lithium secondary battery according to a first embodiment of the present invention, and FIGS. 3A-3B illustrate sectional and plan views, respectively, of the battery of FIG. 2. Referring to FIG. 2, the can type lithium secondary battery according to the present invention may include a can 210, an electrode assembly 212 housed in the can 210 and a cap assembly 220 sealing an upper opening portion 210*a* of the can 210.

The can 210 may be made of, e.g., a metal such as aluminum or aluminum alloy, which exhibits light weight and ductility. The can 210 may have an elongated rectangular shape. The can 210 may receive the electrode assembly 212 through the upper opening portion 210*a*.

The electrode assembly 212 may include a first electrode plate 215, a second electrode plate 213 and a separator 214. The first and second electrode plates 215 and 213 may be stacked so that the separator 214 is interposed therebetween, then this structure may be wound in a jelly roll shape. A first electrode tap 217 may be welded to the first electrode plate 215. An end of the first electrode tap 217 may project beyond the electrode assembly 212. A second tap 216 may be welded to the second electrode plate 213. An end of the second tap 216 may project beyond the electrode assembly 212. The first electrode plate 215 may be used as a cathode electrode plate and the second electrode plate 213 may be used as an anode electrode plate, although the first and second electrode plates 215, 213 may be used differently depending on the structure of the can type lithium secondary battery.

The cap assembly 220 may include an electrode terminal 230, a cap plate 240, an insulation plate 250 and a terminal plate 260. The cap plate 240 may be assembled to an upper end portion of the can 210 so as to seal the can 210.

The cap plate 240 may be made from, e.g., a metal plate, and may have a size corresponding to the upper end portion of the can 210. The cap plate 240 may be welded to the upper end portion of the can 210 so as to seal the can 210. The cap plate may have a through-hole 241 formed at the center portion thereof and may have an electrolyte injection hole 242 formed at a side thereof. A gasket 246, e.g., a gasket having a tubular aspect for encircling the electrode terminal 230, may be fixedly inserted into the through-hole 241 in order to insulate the electrode terminal 230 from the cap plate 240. The electrolyte injection hole 242 may be formed with a desired diameter at a side of the cap plate 240. After the cap assembly 220 is assembled to the upper end portion of the can 210, the electrolyte may be injected into the can 210 through the electrolyte injection hole 242 and the electrolyte injection hole 242 may then be sealed by a separate sealing means 243.

The insulation plate 250 may be formed of an insulation material, e.g., the same material used for the gasket 246. The insulation plate 250 may be attached to the lower surface of the cap plate 240. The insulation plate 250 may have a recess in the bottom surface 252, such that it has sidewalls extending downward from sides and both ends of the bottom plate 252. The recess may correspond to the terminal plate 260. The insulation plate 250 may have a through-hole 251 formed in a predetermined portion thereof. The through-hole 251 may correspond to the through-hole 241 when the insulation plate 250 is attached to the cap plate 240. The electrode terminal 230 may be inserted into the through-holes 241, 251.

The terminal plate 260 may be made of, e.g., a metal such as nickel or an alloy thereof. The terminal plate 260 may be tightly received in the recess of the insulation plate 250, so as to come into contact with the lower surface 252 of the insulation plate 250. The terminal plate 260 may have a through-hole 261 formed in a portion thereof, at a position corresponding to the through-hole 241, for receiving the electrode terminal 230.

An insulation case 270 may be disposed under the cap assembly 220 so as to electrically insulate the cap assembly 220 from the electrode assembly 212. The insulation case 270 may have a first electrode tap hole 272 and a second electrode tap hole 271, such that the second electrode tap 216 may extend through the second electrode tap hole 271 to be connected to the cap plate 240, and the first electrode tap 217 may extend through the first electrode tap hole 272 to be connected to the terminal plate 260.

The electrode terminal 230 may include a terminal body 231 having a predetermined length, a head 232 and at least one safety protuberance 234.

The terminal body 231 may be a rod having, e.g., a circular or square cross section. The terminal body may have sufficient length to extend through and make contact with the terminal plate 260 when the electrode terminal 230 is assembled with the cap assembly 220.

The head 232 may be integrally formed at an upper portion of the terminal body 231 and may have an area larger than the sectional area of the terminal body 231. The head 232 may have, e.g., a circular, oval or polygonal cross section. The height of the head 232 may be set in consideration of the entire height of the can type lithium secondary battery.

The safety protuberance 234 may be provided for the controlled short circuiting of the can type lithium secondary battery under predetermined circumstances. The safety protuberance 234 may be formed on the peripheral surface of the head 232 so as to extend outwardly from the sides of the head 232. Two safety protuberances 234 may be formed on the peripheral surface of the head 232 and may extend in opposing directions. The electrode terminal 230 may be oriented with respect to the cap plate 240 such that the safety protuberance 234 extends in a length direction of the cap plate 240.

The safety protuberance 234 may have, e.g., a circular, oval or polygonal cross section, i.e., as determined in a plane oriented parallel to a major axis MA of the electrode terminal 230. The end of the safety protuberance 234 may have a flat surface, which may enhance the ability of the protuberance 234 to make good electrical contact with the end plate 240 under predetermined conditions. However, an end in the shape of a cone or spherical shape may be inclined with respect to, and/or make poor contact with, the upper surface of the cap plate 240, such that the contact area between the safety protuberance 234 and the cap plate 240 is lessened. Such a configuration may result in the intentional short circuit between the electrode terminal 230 and the cap plate 240 exhibiting a reduced effectiveness.

The electrode terminal 230 may be inserted through the through-holes 241, 251 and 261 into the terminal plate 260 and insulated by the gasket 246. That is, in the cap assembly 220, the electrode terminal 230 may be electrically insulated from the cap plate 240 and electrically connected to the terminal plate 260.

The gasket 246 may have a shape corresponding to the electrode terminal 230 for receiving the electrode terminal 230, although other shapes, e.g., square or rectangular, may also be suitable. The gasket 246 may have a head receiving groove 248, which is formed to receive the head 232 of the electrode terminal 230. The head receiving groove 248 may have a shape corresponding to the lower portion of the head 232

One or more protuberance receiving grooves 249 may be formed in the gasket 246, each protuberance receiving groove corresponding to a safety protuberance 234. The protuberance receiving groove 249 may extend so as to meet the head receiving groove 248, in order to have a shape corresponding to that of the head 232 and the safety protuberance 234 of the electrode terminal 230.

The protuberance receiving groove 249 may extend towards a periphery of the gasket 246 and may end before the periphery of the gasket 246. That is, the protuberance receiving groove 249 may not meet the periphery of the gasket 246, such that the safety protuberance 234, when setting in the protuberance receiving groove 249, is not exposed through the peripheral surface of the gasket 246. Thus, the external surface of the gasket 246 may be cylindrical and may have a circular top edge that is not interrupted by the protuberance receiving groove 249. Such a configuration leaves the end portion of the safety protuberance 234 covered and insulated from components disposed on the cap assembly 220 near the periphery of the electrode terminal 230, in order to avoid unintentional electrical contact between the safety protuberance 234 and, e.g., a wire of a lead plate or a protective circuit board (not shown in drawings) having an opposite polarity to the electrode terminal 230.

The protuberance receiving groove 249 may be formed to be shallower than the head receiving groove 248, i.e., the bottom surface of the protuberance receiving groove 249 is not as deep as the bottom surface of the head receiving groove 248. In particular, if the bottom surface of the protuberance receiving groove 249 is formed too deep, a bottom wall of the protuberance receiving groove 249 may be too thin and fragile, which could allow unwanted contact between the safety protuberance 234 and the cap plate 240 during an intended use of the can type lithium secondary battery. In the assembled can type lithium secondary battery, in a non-deformed state, the lower surface of the safety protuberance 234 may be higher than the bottom surface of the head receiving groove 248. The bottom surface of the protuberance receiving groove 249 need not be lower than the head receiving groove 248.

The gasket 246 and the protuberance 234 of the electrode terminal 230 may be configured to allow electrical contact between the protuberance 234 and the cap plate 240 once the can type lithium secondary battery is subjected to the predetermined force, i.e., a pressure in excess of 13 kN applied in a direction normal to the longitudinal axis of the can type lithium secondary battery. The protuberance 234 may be exposed through a side of the gasket 246 in order to contact the cap plate 240. The can type lithium secondary battery may be made with an end of the protuberance 234 exposed at the side of the gasket 246, or the can type lithium secondary battery may be formed with the end of the protuberance 234 covered by the gasket 246 but configured such that the end of the protuberance 234 can penetrate or break through the gasket 246 once the predetermined force has been applied to the can type lithium secondary battery. The penetration may occur at an end of the protuberance receiving groove 249 through a side of the gasket 246, through a bottom of the protuberance receiving groove 249, or any other suitable location. The cap plate 240 may be bent upward at one or both ends by application of the predetermined force, thereby bringing the protuberance 234 into close contact with the cap plate 240.

Figure 4:
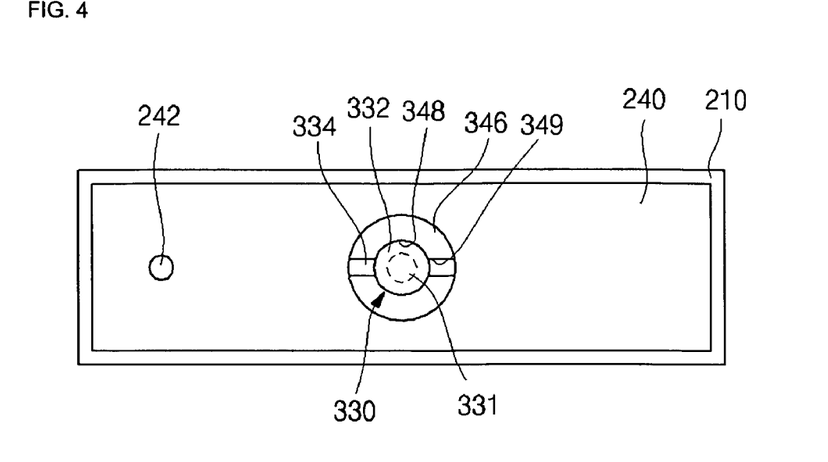
FIG. 4 illustrates a plan view of a can type lithium secondary battery according to a second embodiment of the present invention.

FIG. 4 illustrates a plan view of a can type lithium secondary battery according to a second embodiment of the present invention. Referring to FIG. 4, the can type lithium secondary battery may include an electrode terminal 330 and a gasket 246 insulating the electrode terminal 330 from the cap plate 240. The electrode terminal 330 may include a head 332 and at least one safety protuberance 334 formed at a side of the head 332. Two safety protuberances 334 may be formed at opposing sides of the head 332. The electrode terminal 330 may be oriented with respect to the cap plate 240 such that the safety protuberance 334 extends in a length direction of the cap plate 240.

The gasket 346, e.g., a gasket having a tubular aspect for encircling the electrode terminal 330, may have a head receiving groove 348 and one or more protuberance receiving grooves 349. The protuberance receiving groove 349 may extend to a peripheral surface of the gasket 346. In the assembled, non-deformed can type lithium secondary battery, the end surface of the safety protuberance 334 may be aligned with the peripheral surface of the gasket 346, i.e., the end surface may be located on a substantially identical surface with the peripheral surface of the gasket 346. Thus, the end surface of the safety protuberance 334 may be exposed, rather than covered by the gasket 346. Such a configuration may be implemented to make a contact between the safety protuberance and the cap plate 240 more easily when the can type lithium secondary battery is subjected to a predetermined externally applied force, thereby causing an intentional short circuit between the electrode terminal 330 and the cap plate 240. Such a configuration may be implemented when contact between the safety protuberance 334 and adjacent components, e.g., a lead plate or protective circuit boards, having an opposite polarity is not likely, e.g., due to the absence of such components, the provision of other insulating members to isolate such components, relative positioning of the components, etc.

Figure 5:
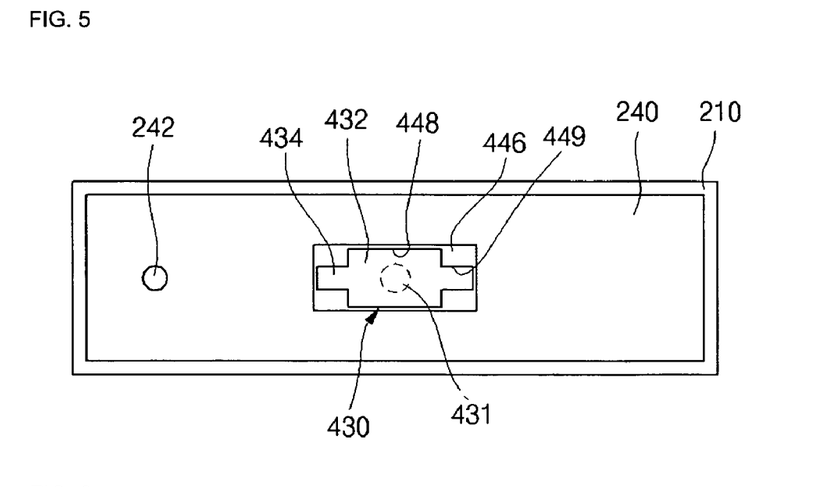
FIG. 5 illustrates a plan view of a can type lithium secondary battery according to a third embodiment of the present invention.

FIG. 5 illustrates a plan view of a can type lithium secondary battery according to a third embodiment of the present invention. Referring to FIG. 5, the can type lithium secondary battery may include an electrode terminal 430 and a gasket 446, e.g., a gasket having a tubular aspect for encircling the electrode terminal 430 and for insulating the electrode terminal 430 from the cap plate 240. The electrode terminal 430 may include a head 432 and at least one safety protuberance 434 formed at a side of the head 432. Two safety protuberances 434 may be formed at opposite sides of the head 432.

The head 432 of the electrode terminal 430 may have a rectangular or oval shape, a long axis of which may be oriented in the direction of the length of the cap plate 240. The safety protuberance 434 may extend in the direction of the long axis. A body 431 of the electrode terminal 430 may be cylindrical or have a circular cross section, as for the embodiments described above. The body 431 may be inserted into the through-hole 241 of the cap plate 240.

The gasket 446 may have an upper portion formed with a shape corresponding to that of the head 432, i.e., the gasket 446 may be rectangular when the head 432 is rectangular, the gasket 446 may be oval when the head 432 is oval, etc., although other shapes, e.g., square or circular, may also be suitable. The gasket 446 may have a head receiving groove 448 and a protuberance receiving groove 449 formed therein. The head receiving groove 448 may be formed to have a shape corresponding to the head 432 of the electrode terminal 430. The protuberance receiving groove may extend towards a periphery of the gasket 446 without intersecting the periphery. Thus, an end surface of the safety protuberance 434 may be covered by the periphery of the gasket 446, as in the embodiment illustrated in FIGS. 2-3B. In other respects, the electrode terminal 430 and the gasket 446 may be similar to those described above in FIGS. 2-3B, and therefore a detailed description thereof will not be repeated.

The safety protuberance 434 may extend a predetermined distance from the center portion of the electrode terminal 430. Upon application of a predetermined externally-applied force to the can type lithium secondary battery, a variation in the upward and downward movements of the safety protuberance 434 may increase with reference to the center portion of the electrode terminal 430, so that the safety protuberance 434 easily comes in contact with the cap plate 240 to cause intentional short circuiting between the electrode terminal 430 and the cap plate 240.

Figure 6:
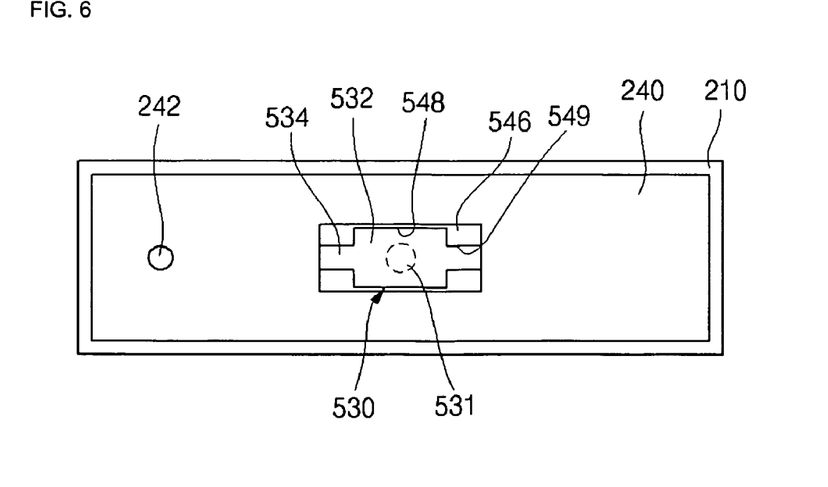
FIG. 6 illustrates a plan view of a can type lithium secondary battery according to a fourth embodiment of the present invention.

FIG. 6 illustrates a plan view of a can type lithium secondary battery according to a fourth embodiment of the present invention. Referring to FIG. 6, the can type lithium secondary battery may include an electrode terminal 530 and a gasket 546 insulating the electrode terminal 530 from the cap plate 240. The electrode terminal 530 may include a head 532 and at least one safety protuberance 534 formed at a side of the head 532. Two safety protuberances 534 may be formed at opposite sides of the head 532.

The head 532 of the electrode terminal 530 may have a rectangular or oval shape, a long axis of which may be oriented in the direction of the length of the cap plate 240. The safety protuberance 534 may extend in the direction of the long axis. A body 531 of the electrode terminal 530 may be cylindrical or have a circular cross section, as for the embodiments described above. The body 531 may be inserted into the through-hole 241 of the cap plate 240.

The gasket 546 may have an upper portion formed with a shape corresponding to that of the head 532, i.e., the gasket 546 may be rectangular when the head 532 is rectangular, the gasket 546 may be oval when the head 532 is oval, etc., although other shapes, e.g., square or circular, may also be suitable. The gasket 546 may have a head receiving groove 548 and a protuberance receiving groove 549 formed therein. The head receiving groove 548 may be formed to have a shape corresponding to the head 532 of the electrode terminal 530. The protuberance receiving groove 549 may extend towards a periphery of the gasket 546 and may intersect the periphery. The safety protuberance 534 of the electrode terminal 530 may have an end surface located on the same plane as the peripheral surface of the gasket 546. Thus, an end surface of the safety protuberance 534 may be exposed at the periphery of the gasket 546, as in the embodiment illustrated in FIG. 4. In other respects, the electrode terminal 530 and the gasket 546 may be similar to those described above in FIGS. 2-3B, and therefore a detailed description thereof will not be repeated.

When the can type lithium secondary battery, in which the electrode terminal 530 and the gasket 546 are mounted, is pressed, the safety protuberance 534 of the electrode terminal 530 may be exposed out of the peripheral surface of the gasket 546 so as to make a contact with the cap plate 240 more easily, thereby causing an intentional short circuit between the electrode terminal 530 and the cap plate 240. Such a configuration may be implemented when contact between the safety protuberance 534 and adjacent components, e.g., a lead plate or protective circuit boards, having an opposite polarity is not likely, e.g., due to the absence of such components, the provision of other insulating members to isolate such components, relative positioning of the components, etc.

Hereinafter, an operation of the can type lithium secondary battery according to an embodiment of the present invention will be described. Referring to FIGS. 3A-3B, the can type lithium secondary battery, in normal use, has the electrode terminal 230 insulated from the cap plate 240 by means of the gasket 246. However, the can type lithium secondary battery may deform if it is subjected to a predetermined externally-applied force or an impact larger than a certain extent, as in the longitudinal compression test. In particular, the cap assembly 220 including the cap plate 240 may be deformed. The cap plate 240 may be deformed into a curved state. The gasket 246 may also be deformed as the cap plate 240 is deformed.

In particular, a wall of the gasket 246 defining the protuberance receiving groove 249 may be thin and may be broken under predetermined conditions, such that the safety protuberance 234 is pushed through the gasket 246, e.g., exposed out of a peripheral surface of the gasket 246. The safety protuberance 234 may come into contact with the cap plate 240 and, as a result, intentional short circuiting between the safety protuberance 234 of the electrode terminal 230 and the cap plate 240 may occur, such that electric current flows between the electrode terminal 230 and the cap plate 240.

More particularly, the electrode terminal 230 may be electrically connected through the terminal plate 260 to the first electrode tap 217 and the first electrode plate 215 of the electrode assembly 212. The cap plate 240 may be electrically connected to the second electrode tap 216 and the second electrode plate 213 of the cap plate 240. Thus, the first and second electrode plates 215, 213, i.e., the cathode and anode electrodes, may be short circuited via the electrical contact between the safety protuberance 234 and the cap plate 240. The electrode terminal 230, the cap plate 240 and the terminal plate 260 may be made of metal having a low electrical resistance. Thus, a relatively large electric current may be passed therethrough without generating excessive resistive heating when the intentional short circuit between these metals occurs.

Moreover, where the safety protuberance and the protuberance receiving groove are formed in the electrode terminal and the gasket as shown in FIGS. 4-6, the intentional short circuit of the metal electrode terminal and cap plate may be easily induced.

Table 1 shows resistance and the heat generation results, which were measured according to the kind of short circuit in a can type lithium secondary battery.

TABLE 1

| Kind Of Short Circuit | Electric Resistance (ohm) | Heat Resistance (J) | Temperature at Short Circuiting Portion (° C.) |
| --- | --- | --- | --- |
| Anode electrode plate - Cathode electrode plate | 11.00 | 3,564 | Higher than 150 |
| Anode electrode plate - Cathode electrode tap | 8.70 | 7,830 | Higher than 100 |
| Can - Electrode terminal | 5.10 | 2,040 | Higher than 150 |
| Cap plate - Electrode terminal | 0.06 | 40 | Higher than 67 |
| Anode tap - Cathode tap | 0.04 | 36 | Higher than 65 |

In the table 1, the first column, Kind of Short Circuit, indicates which structural elements were contacted to form the short circuit. The second column, Electric Resistance, shows a resistance value measured between the anode tap and the cathode tap after the short circuit is caused. The third column, Heat Resistance, shows the heat resistance value. The fourth column, Temperature at Short Circuiting Portion, shows a temperature of the short circuiting portion heated by the short circuit.

The method of measuring the resistance between the structural elements and measuring the temperature of the short circuiting portion will now be described, with reference to first listed example (short circuit between the anode electrode plate and the cathode electrode plate). The anode electrode plate and the cathode electrode plate were cut to a predetermined size and placed in contact with each other between two glass slides. Next, an electric current was applied to the anode and cathode electrode plates and then the electric resistance was measured. Then, an actual battery, fully charged, was provided to discharge the maximum electric current of a cell. The heat resistance was calculated using the electric resistance measured. The temperature at the short circuiting portion was measured by attaching a thermocouple to the exterior portion of the glass slides.

As shown in Table 1, where the short circuit occurs between the anode electrode plate or the cathode electrode plate and another structural element, i.e., rows 1-3 of Table 1, the electric resistance and heat resistance are relatively large, resulting in an increase of the temperature of the short circuiting portion. However, where the short circuiting occurs between the metals such as the electrode terminal and the cap plate, the anode electrode tap and the cathode electrode tap, etc., i.e., rows 4 and 5 of Table 1, the electrical resistance, heat resistance and temperature are relatively low.

Accordingly, a can type lithium secondary battery constructed according to the present invention may be intentionally short circuited when deformed by predetermined force, and the short circuiting of metals between the electrode terminal and the cap plate may minimize the increase in the heat resistance and the temperature of the can type lithium secondary battery. Thus, a margin of safety of the can type lithium secondary battery may be enhanced.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A can type lithium secondary battery, comprising:
   an electrode assembly including a first electrode plate, a second electrode plate, and a separator;
   a can for receiving the electrode assembly and an electrolyte; and
   a cap assembly including a cap plate, an electrode terminal and a gasket, the cap assembly closing an upper opening of the can, wherein:
   the electrode terminal has at least one safety protuberance extending from a head of the electrode terminal, the head formed at an upper portion of the electrode terminal, and
   the gasket has a protuberance receiving groove for receiving the safety protuberance of the electrode terminal and has a head receiving groove for receiving the head of the electrode terminal.

2. The can type lithium secondary battery as claimed in claim 1, wherein:
   a head of the electrode terminal is configured to come into electrical contact with the upper surface of the cap plate when the can type lithium secondary battery is deformed by the longitudinal pressure, and
   the head has a circular, oval or polygonal cross section in a plane oriented parallel to the cap plate.

3. The can type lithium secondary battery as claimed in claim 1, wherein the safety protuberance extends from the head in a length direction of the cap plate.

4. The can type lithium secondary battery as claimed in claim 1, wherein the electrode terminal has two safety protuberances extending from opposite sides of the head, the two safety protuberances extending from the head in a length direction of the cap plate.

5. The can type lithium secondary battery as claimed in claim 1, wherein the safety protuberance has a circular cross section in a plane oriented perpendicular to the cap plate.

6. The can type lithium secondary battery as claimed in claim 1, wherein the safety protuberance is configured to come into electrical contact with the upper surface of the cap plate when the can type lithium secondary battery is deformed by the longitudinal pressure.

7. The can type lithium secondary battery as claimed in claim 1, wherein the safety protuberance has a flat end surface.

8. The can type lithium secondary battery as claimed in claim 4, wherein the gasket has protuberance receiving grooves for receiving the safety protuberances of the electrode terminal and has a head receiving groove for receiving the head of the electrode terminal.

9. The can type lithium secondary battery as claimed in claim 1, wherein the protuberance receiving groove is shallower than the head receiving groove, such that a portion of the gasket underlying the protuberance is thicker than a portion of the gasket underlying the head.

10. The can type lithium secondary battery as claimed in claim 1, wherein the protuberance receiving groove ends a predetermined distance from a peripheral surface of the gasket so as not to meet the peripheral surface of the gasket.

11. The can type lithium secondary battery as claimed in claim 1, wherein the protuberance receiving groove is formed so as to extend through a peripheral surface of the gasket.

12. The can type lithium secondary battery as claimed in claim 1, wherein the cap plate and the electrode terminal have opposite polarities.

13. A battery, comprising:
   a battery can including a cap plate having a first polarity; and
   an electrode terminal extending through the cap plate and having a second polarity, the second polarity opposite the first polarity, wherein:
   the battery is configured to create a short circuit between the electrode terminal and the cap plate when a predetermined force is applied to the battery,
   the battery includes a gasket electrically isolating the electrode terminal from the cap plate until the predetermined force is applied, and
   the electrode terminal includes a protrusion disposed in a recessed portion of the gasket.

14. The battery as claimed in claim 13, wherein the recessed portion of the gasket extends through a peripheral edge of the gasket, such that an end of the protrusion is not covered by the gasket at the peripheral edge.

15. The battery as claimed in claim 13, wherein the recessed portion of the gasket does not extend through a peripheral edge of the gasket, such that an end of the protrusion is covered by the gasket at the peripheral edge.

16. A battery, comprising:
   a battery housing having an electrode assembly disposed therein;
   an electrode terminal extending from the electrode assembly through the battery housing, the electrode terminal having a safety means for short circuiting the battery when a predetermined force is applied to the battery, the safety means being disposed outside the battery housing and the safety means extending from a head of the electrode terminal; and
   an insulating means for maintaining a separation between the electrode terminal and the battery housing, the insulating means being disposed between the electrode terminal and the battery housing and having a safety receiving groove for receiving the safety means of the electrode terminal and a head receiving groove for receiving the head of the electrode terminal, wherein:
   the insulating means maintains the separation between the safety means and the battery housing until the predetermined force is applied, and
   the insulating means allows the safety means and the battery housing to come into electrical contact once the predetermined force is applied.

* * * * *